United States Patent
Arita et al.

(10) Patent No.: US 12,168,809 B2
(45) Date of Patent: Dec. 17, 2024

(54) HOT-ROLLED STEEL SHEET FOR NON-ORIENTED ELECTRICAL STEEL SHEET, NON-ORIENTED ELECTRICAL STEEL SHEET, AND METHOD FOR MANUFACTURING SAME

(71) Applicant: NIPPON STEEL CORPORATION, Tokyo (JP)

(72) Inventors: Yoshihiro Arita, Tokyo (JP); Takeru Ichie, Tokyo (JP); Fuminobu Murakami, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 210 days.

(21) Appl. No.: 17/797,384

(22) PCT Filed: Feb. 19, 2021

(86) PCT No.: PCT/JP2021/006348
§ 371 (c)(1),
(2) Date: Aug. 3, 2022

(87) PCT Pub. No.: WO2021/167065
PCT Pub. Date: Aug. 26, 2021

(65) Prior Publication Data
US 2023/0063410 A1    Mar. 2, 2023

(30) Foreign Application Priority Data
Feb. 20, 2020    (JP) .................................. 2020-027000

(51) Int. Cl.
*C21D 8/12*    (2006.01)
*C21D 9/46*    (2006.01)
(Continued)

(52) U.S. Cl.
CPC ......... *C21D 8/1222* (2013.01); *C21D 8/1233* (2013.01); *C21D 8/1272* (2013.01);
(Continued)

(58) Field of Classification Search
None
See application file for complete search history.

(56) References Cited

U.S. PATENT DOCUMENTS

2014/0238558 A1    8/2014    Fujikura et al.
2020/0087748 A1    3/2020    Lee et al.
2020/0399731 A1   12/2020    Ichie et al.

FOREIGN PATENT DOCUMENTS

JP    4-6220 A      1/1992
JP    6-503609 A    4/1994
(Continued)

OTHER PUBLICATIONS

The Surface Segregation of Copper in Non-oriented Electrical Steels Darja Steiner Petrovic, Djordje Mandrino, Sanja Krajinovic' ISIJ International, vol. 46 (2006), No. 10, pp. 1452-145 (Year: 2006).*

(Continued)

*Primary Examiner* — Jenny R Wu
(74) *Attorney, Agent, or Firm* — Birch, Stewart, Kolasch & Birch, LLP

(57) ABSTRACT

A hot-rolled steel sheet for a non-oriented electrical steel sheet according to one aspect of the present invention contains, by mass %, C: 0.0050% or less, Si: 0.5% or more and 3.5% or less, Mn: 0.1% or more and 1.5% or less, Al: 0.1% or more and 1.5% or less, Cu: 0.01% or more and 0.10% or less, Sn: 0.01% or more and 0.20% or less, and a remainder including Fe and impurities, in which the hot- (Continued)

rolled steel sheet has a Cu concentration peak value of 0.12% or more in a range from a surface thereof to a depth of 10 μm.

5 Claims, 1 Drawing Sheet

(51) Int. Cl.
    *C22C 38/00*     (2006.01)
    *C22C 38/02*     (2006.01)
    *C22C 38/04*     (2006.01)
    *C22C 38/06*     (2006.01)
    *C22C 38/16*     (2006.01)
    *C23G 1/08*     (2006.01)

(52) U.S. Cl.
    CPC .............. *C21D 9/46* (2013.01); *C22C 38/004* (2013.01); *C22C 38/008* (2013.01); *C22C 38/02* (2013.01); *C22C 38/04* (2013.01); *C22C 38/06* (2013.01); *C22C 38/16* (2013.01); *C23G 1/081* (2013.01)

(56) References Cited

FOREIGN PATENT DOCUMENTS

| JP | 2010-242186 A | | 10/2010 |
| JP | 2017-82276 A | | 5/2017 |
| JP | 2018154853 A | * | 10/2018 |
| KR | 10-2018-0070951 A1 | | 6/2018 |
| TW | 201940712 A | | 10/2019 |
| WO | WO 93/08313 A1 | | 4/1993 |
| WO | WO 2013/069754 A1 | | 5/2013 |

OTHER PUBLICATIONS

Japanese Decision to Grant a Patent for corresponding Japanese Application No. 2022-501075, dated Oct. 24, 2023, with English translation.

Japanese Notice of Reasons for Refusal for corresponding Japanese Application No. 2022-501075, dated Jun. 6, 2023, with English translation.

* cited by examiner

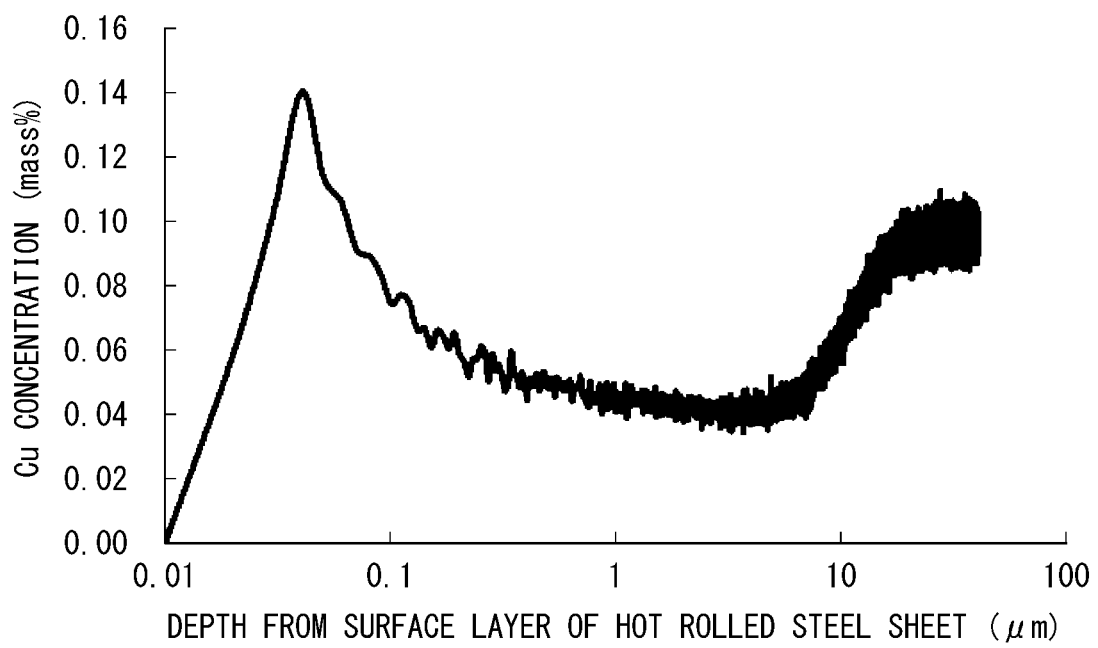

HOT-ROLLED STEEL SHEET FOR NON-ORIENTED ELECTRICAL STEEL SHEET, NON-ORIENTED ELECTRICAL STEEL SHEET, AND METHOD FOR MANUFACTURING SAME

TECHNICAL FIELD OF THE INVENTION

The present invention relates to a hot-rolled steel sheet for a non-oriented electrical steel sheet, a non-oriented electrical steel sheet, and a manufacturing method thereof.

Priority is claimed on Japanese Patent Application No. 2020-027000, filed in Japan on Feb. 20, 2020, the content of which is incorporated herein by reference.

RELATED ART

In recent years, due to the globally intensifying demand for energy saving in electrical equipment, for non-oriented electrical steel sheets that are used as iron core materials for rotating machinery as well, there has been a demand for higher performance characteristics. Specifically, among motors in electrical products, for so-called high-efficiency equipment, high-grade materials having an intrinsic resistance, which is increased by increasing the Si and Al contents, and increased grain sizes have been being used. However, these methods increase the manufacturing costs of non-oriented electrical steel sheets. Therefore, from the viewpoint of cost reduction, it is important to simplify the manufacturing steps.

Self-annealing in hot rolling is a technique by which the skipping of hot-rolled sheet annealing can be expected. The purpose of hot-rolled sheet annealing is the recrystallization of hot-rolled steel sheets (hot-rolled sheets) and the acceleration of grain growth, and this makes it possible to eliminate a problem of a shape defect called rigging and to improve magnetic characteristics. A technique by which this effect is obtained by so-called self-annealing, in which a hot-rolled steel sheet is annealed at a temperature of a hot-rolled coil itself, will be disclosed as follows.

For example, Patent Document 1 discloses a self-annealing technique in which, for a non-oriented electrical steel sheet containing, by mass %, C: ≤0.005%, Si: 0.1% to 2.0%, Mn: 0.05% to 0.6%, and Al: ≤0.5%, having a specified number density of AlN having an average diameter of 10 to 200 nm, and having a favorable magnetic flux density, the coiling temperature of hot rolling is set to 780° C. or higher.

Patent Document 2 discloses a technique for skipping hot-rolled sheet annealing, in which a hot-rolled sheet contains, by mass %, C: ≤0.008%, 2%≤Si+Al≤3%, and 0.02≤Mn≤1.0% and satisfies a relationship of 0.3%≤Al/(Si+Al)≤0.5%, the hot-rolled finish rolling temperature is set to 1050° C. or higher, the subsequent non-water injection time is set to 1 second or longer and 7 seconds or shorter, and the hot-rolled sheet is coiled at 700° C. or lower by water injection cooling.

Patent Document 3 discloses a method in which a hot-rolled steel sheet contains, by weight %, C: 0.010% or less, Si: 0.1% or more and 2.0% or less, Mn: 0.1% or more and 1.5% or less, Al: 0.1% or more and 1.0% or less, Sn: 0.02% or more and 0.20% or less, and Cu: 0.1% or more and 1.0% or less, hot-rolled sheet annealing or self-annealing is carried out at a temperature of the Ac1 transformation point or lower, and a non-oriented electrical steel sheet having a high magnetic flux density and a low iron loss is manufactured.

These methods accelerate grain growth in hot-rolled steel sheets and improve magnetic characteristics while skipping hot-rolled sheet annealing. However, in these methods, there has been created a new problem of an increase in the amount of scale formed on hot-rolled steel sheets, which makes the pickling property poor, decreases the pickling efficiency, or degrades the surface quality of product sheets. Therefore, these methods have a problem in that no merit comparable to the skipping of hot-rolled sheet annealing can be obtained.

PRIOR ART DOCUMENT

Patent Document

[Patent Document 1] PCT International Publication No. WO 2013/069754

[Patent Document 2] Japanese Unexamined Patent Application, First Publication No. 2010-242186

[Patent Document 3] Japanese Unexamined Patent Application, First Publication No. H4-6220

DISCLOSURE OF THE INVENTION

Problems to be Solved by the Invention

The present invention has been made in view of such a problem and provides a hot-rolled steel sheet for a non-oriented electrical steel sheet which reduces a scale residue during pickling and makes the surface quality of product sheets favorable, a manufacturing method thereof, a non-oriented electrical steel sheet, and a manufacturing method thereof.

Means for Solving the Problem

The gist of the present invention is as described below.

(1) A hot-rolled steel sheet for a non-oriented electrical steel sheet according to one aspect of the present invention contains, by mass %, C: 0.0050% or less, Si: 0.5% or more and 3.5% or less, Mn: 0.1% or more and 1.5% or less, Al: 0.1% or more and 1.5% or less, Cu: 0.01% or more and 0.10% or less, Sn: 0.01% or more and 0.20% or less, and a remainder including Fe and impurities, in which the hot-rolled steel sheet has a Cu concentration peak value of 0.12% or more in a range from a surface thereof to a depth of 10 μm.

(2) A non-oriented electrical steel sheet according to another aspect of the present invention contains, by mass %, C: 0.0050% or less, Si: 0.5% or more and 3.5% or less, Mn: 0.1% or more and 1.5% or less, Al: 0.1% or more and 1.5% or less, Cu: 0.01% or more and 0.10% or less, Sn: 0.01% or more and 0.20% or less, and a remainder including Fe and impurities, in which the non-oriented electrical steel sheet has a Cu concentration peak value of 0.12% or more in a range from a surface thereof to a depth of 5 μm.

(3) A manufacturing method of a hot-rolled steel sheet for a non-oriented electrical steel sheet according to another aspect of the present invention is a manufacturing method of the hot-rolled steel sheet for a non-oriented electrical steel sheet according to the (1) including steelmaking and hot rolling, in which the hot rolling includes slab heating, rough rolling, finish rolling, and coiling, an air ratio in the slab heating of the hot rolling is set to 1.0 or more and 1.2 or less, a temperature of a rough-rolled steel sheet immediately before the finish rolling of the hot rolling is set to 1000° C. or higher and 1050° C. or lower, a finish rolling temperature in the finish rolling of the hot rolling is set to 930° C. or higher and 970° C. or lower, and a coiling temperature in the coiling of the hot rolling is set to 750° C. or higher and 800° C. or lower.

(4) A manufacturing method of a non-oriented electrical steel sheet according to another aspect of the present invention is a manufacturing method of the non-oriented electrical steel sheet according to the (2) including pickling, cold rolling, and final annealing, in which, in the cold rolling, the hot-rolled steel sheet for a non-oriented electrical steel sheet according to the (1) is cold-rolled.

(5) The manufacturing method of a non-oriented electrical steel sheet according to the (4), in which a pickling solution used in the pickling may contain thiosulfate.

Effects of the Invention

According to the present invention, it is possible to stably provide a hot-rolled steel sheet for a non-oriented electrical steel sheet and a non-oriented electrical steel sheet which reduce a scale residue during pickling and make the surface qualities of product sheets favorable at low costs.

BRIEF DESCRIPTION OF THE DRAWINGS

FIG. 1 is an example of a Cu concentration chart in a surface layer of a hot-rolled steel sheet according to the present embodiment.

EMBODIMENTS OF THE INVENTION

Regarding a cause for a poor efficiency of scale removal in pickling and the formation of a scale residue in products, which makes the surface quality poor, in non-oriented electrical steel sheets that has undergone self-annealing in hot rolling, but skipped hot-rolled sheet annealing, the present inventors paid attention to surface layer scale of hot-rolled steel sheets after self-annealing and carried out investigation. As a result, it was clarified that scale on the surface layer was extremely thick in a hot-rolled steel sheet self-annealed in hot rolling compared with a hot-rolled steel sheet that had been threaded through hot-rolled sheet annealing. This is because hot-rolled sheet annealing was carried out in an atmosphere-controlled furnace while the self-annealing in the hot rolling was carried out in the atmosphere so that the oxidation of the hot-rolled steel sheet is progressed due to oxygen in the atmosphere.

The present inventors intensively studied a method for suppressing the progress of oxidation in such atmospheric annealing. The idea will be described below.

Hot rolling includes slab heating, hot rolling (rough rolling and finish rolling), and coiling. First, in a slab heating stage, the surface of a slab is oxidized, and scale is formed. However, the scale in this slab heating stage is removed in the middle of hot rolling and does not remain on a hot-rolled steel sheet. Scale remaining on the hot-rolled steel sheet is scale that is formed during finish rolling to coiling and after coiling.

The formation of the scale is an unavoidable problem as long as the effect of self-annealing is taken advantage of. Although a steel sheet temperature of a predetermined value or higher is required for grain growth, it is not possible to control the atmosphere during hot rolling. Therefore, an attempt was made to make the chemical composition of the outermost surface of the hot-rolled steel sheet after the end of the finish rolling of hot rolling oxidation-resistant.

As a result, it was clarified that, when Cu was appropriately contained in steel and Cu was concentrated immediately below surface layer scale in the slab heating stage of the hot rolling, a Cu-concentrated region was exposed on the outermost surface of the hot-rolled steel sheet after finish rolling. The present inventors found that, when the Cu-concentrated region is exposed on the outermost surface of the hot-rolled steel sheet, it is possible to suppress oxidation during self-annealing using the oxidation resistance of Cu.

Furthermore, in pickling following self-annealing, a pickling accelerator mainly containing thiosulfate is added to a pickling solution, thereby it is possible to accelerate the removal of an oxide layer formed by the self-annealing. In addition, the present inventors found that, according to this, it is also possible to avoid the influence on other kinds of steel that are threaded through the same pickling line using the easiness of thiosulfate being decomposed in the pickling solution.

Based on the above-described findings, the present inventors found conditions under which the surface quality of products becomes favorable for hot-rolled steel sheet for a non-oriented electrical steel sheet and non-oriented electrical steel sheets that are self-annealed during hot rolling and completed the present invention.

Subsequently, numerical value-limiting reasons for the components and products of the hot-rolled steel sheet for a non-oriented electrical steel sheet and the non-oriented electrical steel sheet according to the present embodiment will be described. Unless particularly otherwise described, the description of a chemical composition to be described below is applied to both the hot-rolled steel sheet and the non-oriented electrical steel sheet according to the present embodiment. Unless particularly otherwise described, the unit "%" for the amount of each element in the chemical composition means "mass %".

<Chemical Composition>

Hereinafter, the components of the hot-rolled steel sheet and the non-oriented electrical steel sheet will be described.

C degrades the iron loss of the non-oriented electrical steel sheet by magnetic aging. Therefore, the C content is 0.0050% or less. The lower limit of the C content is 0%. On the other hand, from the viewpoint of avoiding the formation of a solid solution of B, the C content may be set to 0.0010% or more. The C content may be set to 0.0045% or less, 0.0040% or less, or 0.0035% or less. The C content may be set to 0.0015% or more, 0.0020% or more, or 0.0025% or more.

Si is an element effective for increasing the electric resistance of the non-oriented electrical steel sheet, and the Si content can be appropriately adjusted according to required characteristics such as the iron loss, the magnetic flux density, and the strength. However, when the Si content is less than 0.5%, an iron loss reduction effect is small. On the other hand, when the Si content exceeds 3.5%, the toughness of the hot-rolled steel sheet and the non-oriented electrical steel sheet becomes low, which makes the manufacturing difficult. Therefore, the values described above were regarded as the upper and lower limits of the Si content, respectively. The Si content may be set to 3.2% or less, 3.0% or less, or 2.5% or less. The Si content may be set to 0.6% or more, 0.8% or more, or 1.0% or more.

Mn acts as a sulfide-forming element and accelerates grain growth in the non-oriented electrical steel sheet. For the purpose of obtaining this effect, the lower limit of the Mn content was set to 0.1%. Furthermore, in order to increase the electric resistance, the Mn content is preferably set to an appropriate amount according to the purpose of adjusting the transformation temperature. The upper limit of the Mn content was set to 1.5% at which these effects were saturated. The Mn content may be set to 1.2% or less, 1.0% or less, or 0.8% or less. The Mn content may be set to 0.2% or more, 0.4% or more, or 0.6% or more.

Al is an element necessary for the deoxidation of steel. The Al content was set to 0.1% or more from the viewpoint of ensuring a stable deoxidation effect and suppressing the formation of fine AlN. Furthermore, an appropriate amount of Al may be contained in order to increase the electric resistance. On the other hand, excess Al degrades the castability in steelmaking. Therefore, the upper limit of the Al content was set to 1.5%. The Al content may be set to 1.2% or less, 1.0% or less, or 0.8% or less. The Al content may be set to 0.2% or more, 0.4% or more, or 0.6% or more.

Cu is an important element in the hot-rolled steel sheet and the non-oriented electrical steel sheet according to the present embodiment. When an appropriate amount of Cu is contained in slab, the characteristic of Cu that is less likely to be oxidized than iron or silicon is taken advantage of and Cu is concentrated in the surface layer of the hot-rolled steel sheet, so that scale formation is suppressed. In order to obtain the above-described effects, the Cu content was set to 0.01% or more. Cu may be more preferably set to 0.010% or more, 0.02% or more, 0.020% or more, 0.05% or more, or 0.050% or more. However, when the Cu content exceeds 0.10%, a scab defect is likely to be initiated. Therefore, the upper limit of the Cu content was set to 0.10%. The Cu content may be set to 0.100% or less, 0.08% or less, 0.080% or less, 0.07% or less, 0.070% or less, 0.06% or less, or 0.060% or less.

Sn is an important element in the hot-rolled steel sheet and the non-oriented electrical steel sheet according to the present embodiment. When the characteristic of Sn that is less likely to be oxidized than iron or silicon is taken advantage of and an appropriate amount of Sn is contained in the slab, it is possible to suppress scale formation during hot rolling. In order to obtain the above-described effects, the Sn content was set to 0.01% or more. The Sn content may be more preferably set to 0.010% or more, 0.02% or more, 0.020% or more, 0.05% or more, or 0.050% or more. However, when the Sn content exceeds 0.20%, the effects are saturated. Therefore, the upper limit of the Sn content was set to 0.20%. The Sn content may be set to 0.200% or less, 0.15% or less, 0.150% or less, 0.10% or less, 0.100% or less, 0.08% or less, or 0.080% or less.

The remainder of the chemical composition of the hot-rolled steel sheet and the non-oriented electrical steel sheet according to the present embodiment is Fe and impurities. The impurities mean a small amount of elements that are permitted to an extent that the hot-rolled steel sheet and the non-oriented electrical steel sheet according to the present embodiment are not adversely affected.

<Cu Concentration Peak of Hot-Rolled Steel Sheet for Non-Oriented Electrical Steel Sheet>

In the hot-rolled steel sheet for a non-oriented electrical steel sheet according to the present embodiment, a Cu-concentrated layer in the surface layer is specified. First, the Cu concentration needs to have a peak between the surface of the hot-rolled steel sheet and a depth of 10 μm. Furthermore, when the Cu concentration peak value is less than 0.12%, the oxidation of the hot-rolled steel sheet progresses, and a favorable surface quality cannot be obtained as a product sheet. Therefore, the hot-rolled steel sheet according to the present embodiment is assumed to have a Cu concentration peak value of 0.12% or more in a range from the surface to a depth of 10 μm. The Cu concentration peak value in the range from the surface of the hot-rolled steel sheet to the depth of 10 μm may be 0.13% or more, 0.14% or more, 0.15% or more, or 0.20% or more. The upper limit value of the Cu concentration peak value in the range from the surface of the hot-rolled steel sheet to the depth of 10 μm is not particularly limited, and, for example, the Cu concentration peak value may be set to 1.00% or less, 0.90% or less, 0.70% or less, or 0.65% or less.

<Cu Concentration Peak of Non-Oriented Electrical Steel Sheet>

In the non-oriented electrical steel sheet according to the present embodiment as well, similar to the hot-rolled steel sheet, a Cu-concentrated layer in the surface layer is specified. Here, the non-oriented electrical steel sheet is obtained by cold-rolling the hot-rolled steel sheet. In the non-oriented electrical steel sheet obtained by cold-rolling a hot-rolled steel sheet in which the above-described Cu peak position is within the preferable range, it is normal for the Cu concentration to have a peak between the surface to a depth of 5 μm. Therefore, the non-oriented electrical steel sheet according to the present embodiment is assumed to have a Cu concentration peak value of 0.12% or more in a range from the surface to a depth of 5 μm. When the Cu concentration peak value is less than 0.12%, oxidation progresses in the hot-rolled steel sheet stage, and a favorable surface quality cannot be obtained as a product sheet. The Cu concentration peak value in the range from the surface of the non-oriented electrical steel sheet to the depth of 5 μm may be 0.13% or more, 0.14% or more, 0.15% or more, or 0.20% or more. The upper limit value of the Cu concentration peak value in the range from the surface of the non-oriented electrical steel sheet to the depth of 5 μm is not particularly limited, and, for example, the Cu concentration peak value may be set to 1.00% or less, 0.90% or less, 0.70% or less, or 0.65% or less.

In both the hot-rolled steel sheet and the non-oriented electrical steel sheet, the Cu concentration peak values are specified using a glow discharge spectrometer (GDS). Specific methods are as described below.

Pretreatment: The surface of the hot-rolled steel sheet or the non-oriented electrical steel sheet is cleaned. In a case where the non-oriented electrical steel sheet has an insulating film, the insulating film is removed, and then the surface is cleaned. Furthermore, several nanometers of the surface layer of the hot-rolled steel sheet or the non-oriented electrical steel sheet is removed by argon sputtering.

Measurement: The distribution of the Cu concentration in the depth direction is measured using the GDS. As a result, a Cu concentration chart as exemplified in FIG. 1 is obtained. Based on the position and height of a Cu concentration peak shown in this concentration chart, whether or not the Cu concentration peak is included in a predetermined position and whether or not the concentration is within a predetermined range are determined.

<Manufacturing Method>

Next, a manufacturing method of the hot-rolled steel sheet for a non-oriented electrical steel sheet and the non-oriented electrical steel sheet according to the present embodiment will be described.

The manufacturing method of the hot-rolled steel sheet according to the present embodiment includes steelmaking and hot rolling, the hot rolling includes slab heating, rough rolling, finish rolling, and coiling, the air ratio in the slab heating of the hot rolling is set to 1.0 or more and 1.2 or less, the temperature of a rough-rolled steel sheet immediately before the finish rolling of the hot rolling (a steel sheet obtained by rough-rolling a slab) is set to 1000° C. or higher and 1050° C. or lower, the finish temperature in the finish rolling of the hot rolling is set to 930° C. or higher and 970° C. or lower, and the coiling temperature in the coiling of the hot rolling is set to 750° C. or higher and 800° C. or lower. Hereinafter, the reasons for limiting the manufacturing conditions in the manufacturing method according to the present embodiment will be described.

The steelmaking is not particularly limited. Here, the components of the slab need to be appropriately adjusted by a well-known method such that the chemical compositions of the hot-rolled steel sheet and the non-oriented electrical steel sheet are within the above-described range.

In the hot rolling, after the slab is heated, rough rolling and finish rolling are carried out on the slab to obtain a hot-rolled steel sheet, and furthermore, this hot-rolled steel sheet is coiled.

In the manufacturing method according to the present embodiment, it is necessary to concentrate Cu immediately below scale by sufficiently forming the scale on the slab in the slab heating stage. In such a case, it is possible to expose a sufficient Cu-concentrated layer on the surface of the steel sheet by a descaling treatment before the finish rolling. In order for that, the air ratio in the slab heating is set within a range of 1.0 to 1.2. In a case where the air ratio is less than 1.0, there are cases where Cu concentration does not sufficiently progress and the Cu-concentrated layer cannot be obtained. In a case where the air ratio is more than 1.2, the amount of the scale becomes extremely large, the scale cannot be sufficiently removed by a variety of descaling methods, and the surface properties of the hot-rolled steel sheet or the non-oriented electrical steel sheet deteriorate.

Furthermore, the temperature of a rough-rolled steel sheet before the subsequent finish rolling is set to 1000° C. or higher and 1050° C. or lower, and the finish rolling temperature is set to 930° C. or higher and 970° C. or lower. This makes it possible to further concentrate Cu.

In addition, the coiling temperature is set to 750° C. or higher, whereby the hot-rolled steel sheet is made to be self-annealed, which makes it possible to accelerate grain growth. In addition, the coiling temperature is set to 800° C. or lower, whereby the internal oxidation of the hot-rolled steel sheet can be suppressed.

The manufacturing method of the non-oriented electrical steel sheet according to the present embodiment includes: manufacturing the hot-rolled steel sheet according to the present embodiment (that is, the above-described manufacturing method of the hot-rolled steel sheet according to the present embodiment); pickling; cold rolling; and final annealing. The cold rolling and the final annealing are not particularly limited, and well-known conditions can be appropriately adopted.

The pickling is also not particularly limited. Here, a pickling accelerator is preferably added to a pickling solution for the purpose of further accelerating the removal of an internal oxidation layer (scale) formed during the self-annealing. There are cases where the pickling solution remains in the manufacturing stage, which creates a concern that an adverse effect is caused at the time of manufacturing other kinds of steel. As a pickling accelerator that does not adversely affect other kinds of steel in which no internal oxidation layer is present, a thiosulfate-based pickling accelerator is exemplified.

EXAMPLES (A) Hot-Rolled Steel Sheets

Slabs having a chemical composition shown in Table 1 were hot-rolled under slab heating conditions and finish rolling conditions shown in Table 2, thereby obtaining hot-rolled steel sheets shown in Table 3. In these tables, values outside the scope of the invention are underlined. These hot-rolled steel sheets were evaluated by the following methods.

(1) Measurement of Cu Concentration Peak Values

Pretreatment: The surfaces of the hot-rolled steel sheets were cleaned. Furthermore, several nanometers of the surface layers of the hot-rolled steel sheets were removed by argon sputtering.

Measurement: The distributions of the Cu concentrations in the depth direction were measured using a GDS to obtain Cu concentration charts. Based on the positions and heights of Cu concentration peaks shown in these concentration charts, whether or not the Cu concentration peak was included in a predetermined position and whether or not the concentration was within a predetermined range were determined. Table 3 shows the heights of the Cu concentration peaks (Cu concentration peak values).

(2) Evaluation of Scale Residue During Pickling (Evaluation of Scale After Pickling)

The hot-rolled steel sheets were immersed in a 6% hydrochloric acid solution for 60 seconds, then, cross sections were mirror-polished, and the thicknesses of internal oxidation layers (that is, the thicknesses of scale) were measured with an optical microscope. Steel sheets having a scale thickness of 1 μm or less, which was obtained by the measurement, were determined as hot-rolled steel sheets having favorable scale evaluation. The thicknesses of the scale may be measured using a scanning electron microscope.

TABLE 1

| Steel No. | Chemical Composition (mass %) | | | | | |
|---|---|---|---|---|---|---|
| | C | Si | Mn | Al | Cu | Sn |
| A1 | 0.0050 | 1.20 | 0.20 | 0.30 | 0.02 | 0.07 |
| A2 | 0.0035 | 0.50 | 0.15 | 0.20 | 0.03 | 0.04 |
| A3 | 0.0040 | 3.50 | 0.30 | 0.45 | 0.04 | 0.11 |
| A4 | 0.0045 | 2.95 | 0.10 | 0.60 | 0.03 | 0.15 |
| A5 | 0.0023 | 2.70 | 1.50 | 0.85 | 0.06 | 0.18 |
| A6 | 0.0018 | 2.50 | 0.30 | 0.10 | 0.09 | 0.19 |
| A7 | 0.0009 | 2.20 | 0.40 | 1.50 | 0.08 | 0.08 |
| A8 | 0.0012 | 2.10 | 1.20 | 0.50 | 0.01 | 0.02 |
| A9 | 0.0015 | 1.90 | 1.40 | 0.70 | 0.10 | 0.04 |
| A10 | 0.0025 | 1.60 | 0.90 | 1.20 | 0.03 | 0.01 |
| A11 | 0.0020 | 3.10 | 0.80 | 1.40 | 0.02 | 0.20 |
| A12 | 0.0010 | 2.70 | 0.50 | 0.60 | 0.03 | 0.03 |
| A13 | 0.0032 | 2.40 | 0.70 | 0.40 | 0.04 | 0.05 |
| a1 | <u>0.0055</u> | 0.55 | 0.20 | 0.12 | 0.01 | 0.02 |
| a2 | 0.0021 | <u>0.40</u> | 0.30 | 0.22 | 0.02 | 0.03 |
| a3 | 0.0034 | <u>3.60</u> | 0.40 | 0.27 | 0.03 | 0.04 |
| a4 | 0.0017 | <u>0.76</u> | 0.04 | 0.33 | 0.03 | 0.05 |
| a5 | 0.0027 | 0.99 | <u>1.60</u> | 0.55 | 0.05 | 0.03 |
| a6 | 0.0042 | 1.22 | <u>0.50</u> | <u>0.03</u> | 0.08 | 0.06 |
| a7 | 0.0016 | 1.54 | 0.30 | <u>1.60</u> | 0.06 | 0.08 |
| a8 | 0.0033 | 1.78 | 0.50 | <u>0.68</u> | <u>0.008</u> | 0.03 |
| a9 | 0.0047 | 1.95 | 0.30 | 0.88 | <u>0.12</u> | 0.02 |
| a10 | 0.0012 | 2.77 | 0.60 | 0.99 | <u>0.02</u> | <u>0.005</u> |
| a11 | 0.0010 | 2.99 | 0.80 | 1.22 | 0.04 | <u>0.23</u> |

TABLE 2

| | Slab heating | | Finish rolling | | |
|---|---|---|---|---|---|
| Hot rolling symbol | Keeping temperature (° C.) | Air ratio (—) | Temperature before finish rolling (° C.) | Finish temperature (° C.) | Coiling temperature (° C.) |
| B1 | 1100 | 1.0 | 1020 | 940 | 760 |

TABLE 2-continued

| | Slab heating | | Finish rolling | | |
|---|---|---|---|---|---|
| Hot rolling symbol | Keeping temperature (° C.) | Air ratio (—) | Temperature before finish rolling (° C.) | Finish temperature (° C.) | Coiling temperature (° C.) |
| B2 | 1120 | 1.2 | 1040 | 950 | 770 |
| B3 | 1070 | 1.1 | 1000 | 960 | 780 |
| B4 | 1150 | 1.2 | 1050 | 950 | 760 |
| B5 | 1120 | 1.0 | 1030 | 930 | 790 |
| B6 | 1110 | 1.0 | 1010 | 970 | 770 |
| B7 | 1100 | 1.1 | 1020 | 940 | 750 |
| B8 | 1080 | 1.0 | 1030 | 950 | 800 |
| B9 | 1130 | 1.1 | 1040 | 960 | 780 |
| B10 | 1090 | 1.2 | 1030 | 940 | 790 |
| b1 | 1100 | <u>0.8</u> | 1010 | 940 | 760 |
| b2 | 1100 | <u>1.5</u> | 1000 | 950 | 780 |
| b3 | 1050 | <u>1.1</u> | <u>990</u> | 960 | 790 |
| b4 | 1180 | 1.2 | <u>1060</u> | 970 | 770 |
| b5 | 1110 | 1.0 | <u>1010</u> | <u>920</u> | 760 |
| b6 | 1120 | 1.1 | 1020 | <u>980</u> | 770 |
| b7 | 1100 | 1.0 | 1010 | <u>930</u> | <u>740</u> |
| b8 | 1120 | 1.2 | 1030 | 950 | <u>810</u> |

TABLE 3

| | | | | Hot-rolled steel sheet | |
|---|---|---|---|---|---|
| | Symbol | Steel No. | Hot rolling symbol | Cu concentration peak value (%) | Evaluation of scale after pickling |
| Inventive examples | C1 | A13 | B1 | 0.12 | GOOD |
| | C2 | A13 | B2 | 0.13 | GOOD |
| | C3 | A13 | B3 | 0.15 | GOOD |
| | C4 | A13 | B4 | 0.14 | GOOD |
| | C5 | A13 | B5 | 0.17 | GOOD |
| | C6 | A13 | B6 | 0.22 | GOOD |
| | C7 | A13 | B7 | 0.24 | GOOD |
| | C8 | A13 | B8 | 0.21 | GOOD |
| | C9 | A13 | B9 | 0.45 | GOOD |
| | C10 | A13 | B10 | 0.18 | GOOD |
| | C11 | A8 | B1 | 0.34 | GOOD |
| | C12 | A8 | B2 | 0.65 | GOOD |
| | C13 | A8 | B3 | 0.22 | GOOD |
| Comparative examples | c1 | a9 | b1 | <u>0.05</u> | BAD |
| | c2 | a11 | b2 | <u>0.05</u> | BAD |
| | c3 | a10 | b3 | <u>0.08</u> | BAD |
| | c4 | A8 | b4 | <u>0.05</u> | BAD |
| | c5 | a10 | b5 | <u>0.06</u> | BAD |
| | c6 | a10 | b6 | <u>0.07</u> | BAD |
| | c7 | a8 | b7 | <u>0.09</u> | BAD |
| | c8 | A8 | b8 | <u>0.04</u> | BAD |

Hot-rolled steel sheets C1 to C13 obtained by hot-rolling the slabs having a chemical composition within the scope of the invention under the manufacturing conditions within the scope of the invention had a Cu concentration peak value of 0.12% or more within a range from the surface to a depth of 10 μm. Furthermore, the hot-rolled steel sheets C1 to C13 had a small amount of a scale residue during pickling On the other hand, in Comparative Examples c1 to c8, there was a large amount of a scale residue during pickling.

Specifically, in Comparative Example c1, a scale residue having a thickness of 5 μm was confirmed.

In Comparative Example c2, a scale residue having a thickness of 6 μm was confirmed.

In Comparative Example c3, a scale residue having a thickness of 8 μm was confirmed.

In Comparative Example c4, a scale residue having a thickness of 15 μm was confirmed.

In Comparative Example c5, a scale residue having a thickness of 13 μm was confirmed.

In Comparative Example c6, a scale residue having a thickness of 11 μm was confirmed.

In Comparative Example c7, a scale residue having a thickness of 10 μm was confirmed.

In Comparative Example c8, a scale residue having a thickness of 18 μm was confirmed.

(B) Non-Oriented Electrical Steel Sheet

Slabs having a chemical composition shown in Table 1 were hot-rolled under slab heating conditions and finish rolling conditions shown in Table 2, thereby obtaining hot-rolled steel sheets. These hot-rolled steel sheets were pickled, hot-rolled, and final-annealed, thereby obtaining non-oriented electrical steel sheets shown in Table 4. In Table 4, values outside the scope of the invention are underlined. As the pickling conditions, the hot-rolled steel sheets were immersed in 8% hydrochloric acid for 90 seconds. The Cu concentration peak values of these non-oriented electrical steel sheets were evaluated by the same method as for the above-described hot-rolled steel sheets. Furthermore, the surface qualities of these non-oriented electrical steel sheets were evaluated by observing the cross sections with an optical microscope. Specifically, the cross sections of the non-oriented electrical steel sheets after final annealing were mirror-polished, and the thicknesses of scale were measured with an optical microscope. Non-oriented electrical steel sheets having a scale thickness of 1 μm or less, which was obtained by the observation, were determined as non-oriented electrical steel sheets having a favorable product surface quality. Regarding the non-oriented electrical steel sheets to which an insulating film had been applied after the final annealing, the thicknesses of scale may be evaluated after the insulating films were removed by immersing the non-oriented electrical steel sheets in a high-temperature alkaline solution or the like and washing the non-oriented electrical steel sheets with water. In addition, the thicknesses of the scale may be measured using a scanning electron microscope.

TABLE 4

| | | | | Non-oriented electrical steel sheet | |
|---|---|---|---|---|---|
| | Symbol | Steel No. | Hot rolling symbol | Cu concentration peak value (%) | Product surface quality |
| Inventive examples | D1 | A1 | B3 | 0.14 | GOOD |
| | D2 | A2 | B3 | 0.17 | GOOD |
| | D3 | A3 | B3 | 0.21 | GOOD |
| | D4 | A4 | B3 | 0.13 | GOOD |
| | D5 | A5 | B3 | 0.34 | GOOD |
| | D6 | A6 | B3 | 0.32 | GOOD |
| | D7 | A7 | B3 | 0.23 | GOOD |
| | D8 | A8 | B3 | 0.12 | GOOD |
| | D9 | A9 | B3 | 0.55 | GOOD |
| | D10 | A10 | B3 | 0.15 | GOOD |
| | D11 | A11 | B3 | 0.18 | GOOD |
| | D12 | A12 | B3 | 0.19 | GOOD |
| | D13 | A13 | B3 | 0.21 | GOOD |
| Comparative examples | d1 | a1 | b1 | <u>0.01</u> | BAD |
| | d2 | a2 | b1 | <u>0.02</u> | BAD |
| | d3 | a3 | b1 | <u>0.03</u> | BAD |
| | d4 | a4 | b1 | <u>0.03</u> | BAD |
| | d5 | a5 | b1 | <u>0.05</u> | BAD |
| | d6 | a6 | B1 | <u>0.08</u> | BAD |
| | d7 | a7 | B1 | <u>0.06</u> | BAD |
| | d8 | a8 | B3 | <u>0.008</u> | BAD |

Non-oriented electrical steel sheets D1 to D13 obtained by hot-rolling the slabs having a chemical composition within the scope of the invention under the manufacturing conditions within the scope of the invention had a Cu concentration peak value of 0.12% or more within a range from the surface to a depth of 5 µm. Furthermore, the hot-rolled steel sheets D1 to D13 had a favorable surface quality.

On the other hand, in Comparative Examples d1 to d8, there was a large amount of a scale residue during pickling.

Specifically, in Comparative Example d1, a scale residue having a thickness of 5 µm was confirmed.

In Comparative Example d2, a scale residue having a thickness of 6 µm was confirmed.

In Comparative Example d3, a scale residue having a thickness of 8 µm was confirmed.

In Comparative Example d4, a scale residue having a thickness of 9 µm was confirmed.

In Comparative Example d5, a scale residue having a thickness of 12 µm was confirmed.

In Comparative Example d6, a scale residue having a thickness of 10 µm was confirmed.

In Comparative Example d7, a scale residue having a thickness of 7 µm was confirmed.

In Comparative Example d8, a scale residue having a thickness of 11 µm was confirmed.

INDUSTRIAL APPLICABILITY

According to the present invention, it is possible to stably provide a hot-rolled steel sheet for a non-oriented electrical steel sheet and a non-oriented electrical steel sheet which reduce a scale residue during pickling and make the surface qualities of product sheets favorable at low costs. Therefore, the present invention has high industrial applicability.

The invention claimed is:

1. A hot-rolled steel sheet for a non-oriented electrical steel sheet comprising, by mass %:
    C: 0.0050% or less;
    Si: 0.5% or more and 3.5% or less;
    Mn: 0.1% or more and 1.5% or less;
    Al: 0.1% or more and 1.5% or less;
    Cu: 0.010% or more and 0.10% or less;
    Sn: 0.010% or more and 0.20% or less; and
    a remainder including Fe and impurities,
    wherein the hot-rolled steel sheet has a Cu concentration peak value of 0.12% or more in a range from a surface thereof to a depth of 10 µm.

2. A non-oriented electrical steel sheet comprising, by mass %:
    C: 0.0050% or less;
    Si: 0.5% or more and 3.5% or less;
    Mn: 0.1% or more and 1.5% or less;
    Al: 0.1% or more and 1.5% or less;
    Cu: 0.010% or more and 0.10% or less;
    Sn: 0.010% or more and 0.20% or less; and
    a remainder including Fe and impurities,
    wherein the non-oriented electrical steel sheet has a Cu concentration peak value of 0.12% or more in a range from a surface thereof to a depth of 5 µm.

3. A manufacturing method of the hot-rolled steel sheet for a non-oriented electrical steel sheet according to claim 1, the method comprising:
    steelmaking; and
    hot rolling,
    wherein the hot rolling includes slab heating, rough rolling, finish rolling, and coiling,
    an air ratio in the slab heating of the hot rolling is set to 1.0 or more and 1.2 or less,
    a temperature of a rough-rolled steel sheet immediately before the finish rolling of the hot rolling is set to 1000° C. or higher and 1050° C. or lower,
    a finish rolling temperature in the finish rolling of the hot rolling is set to 930° C. or higher and 970° C. or lower, and
    a coiling temperature in the coiling of the hot rolling is set to 750° C. or higher and 800° C. or lower.

4. A manufacturing method of the non-oriented electrical steel sheet according to claim 2, the method comprising:
    pickling;
    cold rolling; and
    final annealing,
    wherein, in the cold rolling, the hot-rolled steel sheet for a non-oriented electrical steel sheet comprising, by mass %:
    C: 0.0050% or less;
    Si: 0.5% or more and 3.5% or less;
    Mn: 0.1% or more and 1.5% or less;
    Al: 0.1% or more and 1.5% or less;
    Cu: 0.010% or more and 0.10% or less;
    Sn: 0.010% or more and 0.20% or less; and
    a remainder including Fe and impurities,
    wherein the hot-rolled steel sheet has a Cu concentration peak value of 0.12% or more in a range from a surface thereof to a depth of 10 µm,
    is cold-rolled.

5. The manufacturing method of the non-oriented electrical steel sheet according to claim 4,
    wherein a pickling solution used in the pickling contains thiosulfate.

* * * * *